United States Patent
Hamon et al.

(10) Patent No.: US 9,544,276 B2
(45) Date of Patent: Jan. 10, 2017

(54) METHOD FOR TRANSMITTING AND RECEIVING A MULTIMEDIA CONTENT

(75) Inventors: Vincent Hamon, Rennes (FR); Gilles Dubroeucq, Saint Piat (FR)

(73) Assignee: Viaccess, Paris la Defense (FR)

( * ) Notice: Subject to any disclaimer, the term of this patent is extended or adjusted under 35 U.S.C. 154(b) by 452 days.

(21) Appl. No.: 13/977,260

(22) PCT Filed: Dec. 16, 2011

(86) PCT No.: PCT/EP2011/073148
§ 371 (c)(1),
(2), (4) Date: Jun. 28, 2013

(87) PCT Pub. No.: WO2012/089542
PCT Pub. Date: Jul. 5, 2012

(65) Prior Publication Data
US 2013/0279696 A1 Oct. 24, 2013

(30) Foreign Application Priority Data
Dec. 29, 2010 (FR) ...................... 10 61339

(51) Int. Cl.
*H04K 1/00* (2006.01)
*H04N 7/167* (2011.01)
(Continued)

(52) U.S. Cl.
CPC .......... *H04L 63/0428* (2013.01); *H04L 9/088* (2013.01); *H04L 2209/56* (2013.01); *H04L 2209/60* (2013.01)

(58) Field of Classification Search
CPC .......... H04L 2209/60; H04L 2209/601; H04L 2209/603; H04L 9/12; H04L 9/16; H04L 9/0891; H04N 7/167; H04N 21/2347; H04N 7/1675; H04N 21/26606; H04N 21/4437; H04N 21/4623; H04N 21/4627; H04N 21/2221; G06F 21/10
See application file for complete search history.

(56) References Cited

U.S. PATENT DOCUMENTS 7,809,942 B2 * 10/2010 Baran et al. ................... 713/160
2003/0182579 A1 * 9/2003 Leporini et al. ............... 713/201
(Continued)

FOREIGN PATENT DOCUMENTS

EP  1 320 006 A1  6/2003
FR  2 922 393 A1  4/2009
(Continued)

*Primary Examiner* — Michael S McNally
*Assistant Examiner* — Trong Nguyen
(74) *Attorney, Agent, or Firm* — Occhiuti & Rohlicek LLP

(57) ABSTRACT

A method for transmitting and receiving multimedia content having cryptoperiods scrambled by a control word includes a sender using an operating key and an encryption algorithm in a first virtual mother card to encrypt the control word to obtain a cryptogram, using a syntax constructor also in the first virtual mother card to generate an ECM that incorporates the cryptogram, and transmitting it to a terminal. The terminal receives the ECM and using a syntax analyzer contained in a first virtual daughter card associated with the mother card and uses it to locate a position of the cryptogram CW*t in the ECM. Using an operating key of a decryption algorithm in the daughter card, it then decrypts the cryptogram. Then, using the decrypted control word, it proceeds to descramble the cryptoperiod. Meanwhile, the sender occasionally changes the virtual mother card into a different virtual mother card.

18 Claims, 5 Drawing Sheets

(51) Int. Cl.
*H04L 29/06* (2006.01)
*H04L 9/08* (2006.01)

(56) References Cited

U.S. PATENT DOCUMENTS

| | | | |
|---|---|---|---|
| 2005/0169468 A1 | 8/2005 | Fahrny et al. | |
| 2008/0313463 A1* | 12/2008 | Depietro et al. | 713/170 |
| 2009/0080648 A1 | 3/2009 | Pinder | |
| 2010/0020969 A1* | 1/2010 | Huin et al. | 380/239 |
| 2011/0213976 A1* | 9/2011 | Ryou et al. | 713/169 |
| 2012/0051541 A1* | 3/2012 | Wang et al. | 380/255 |

FOREIGN PATENT DOCUMENTS

| | | |
|---|---|---|
| WO | 2009/112966 A2 | 9/2009 |
| WO | WO 2010062028 A2 * | 6/2010 |

\* cited by examiner

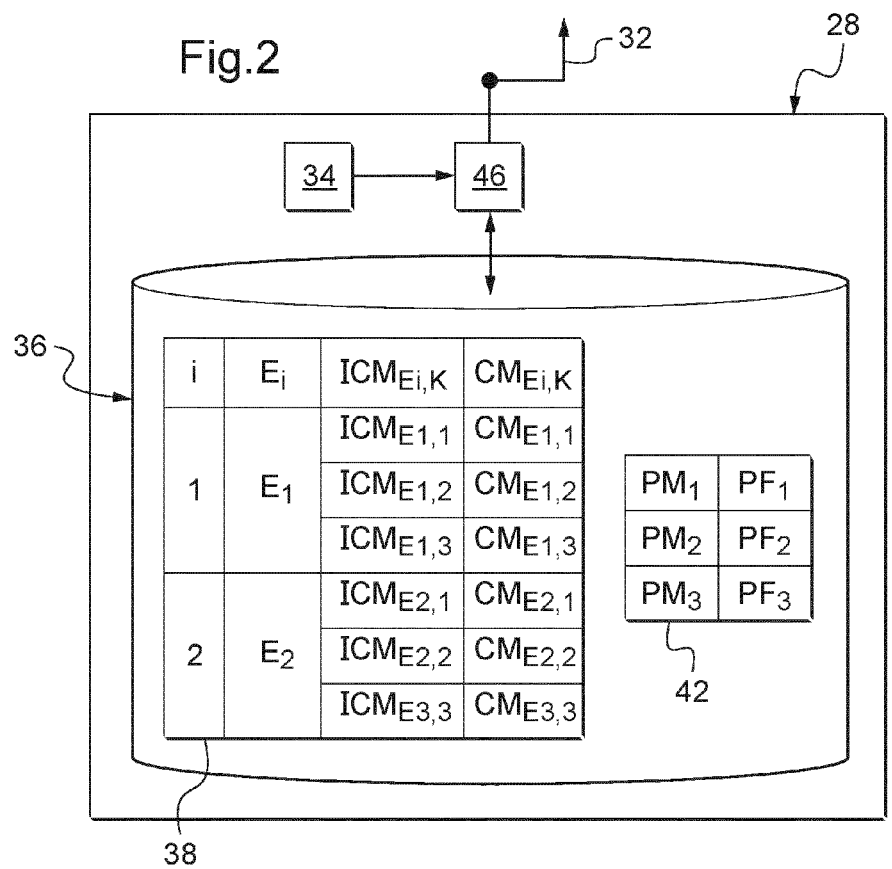
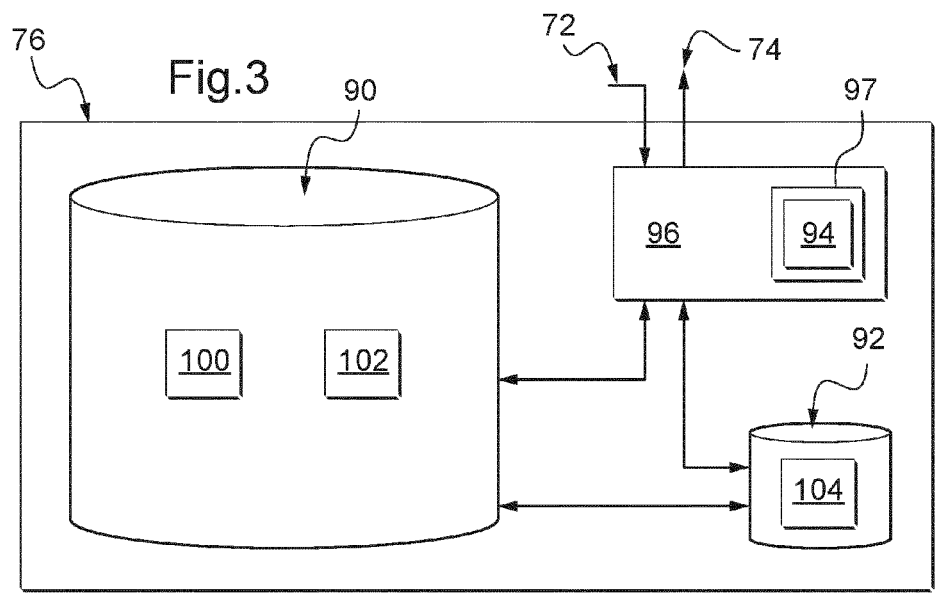

Fig.3a
| i | $ICF_{Ei,K}$ | $CF^*_{Ei,K}$ |
|---|---|---|
|   | $ICF_{E1,1}$ | $CF^*_{E1,1}$ |
| 1 | $ICF_{E1,2}$ | $CF^*_{E1,2}$ |
|   | $ICF_{E1,3}$ | $CF^*_{E1,3}$ |
| 2 | | |
100
Fig.3b
| i | $ICF_{Ei,K}$ | $K\text{-}CF_{Ei,K}$ | $Ksign\_CF_{Ei,K}$ |
|---|---|---|---|
|   | $ICF_{E1,1}$ | $K\text{-}CF_{E1,1}$ | $K\text{-}CF_{E1,1}$ |
| 1 | $ICF_{E1,2}$ | $K\text{-}CF_{E1,2}$ | $K\text{-}CF_{E1,2}$ |
|   | $ICF_{E1,3}$ | $K\text{-}CF_{E1,3}$ | $K\text{-}CF_{E1,3}$ |
| 2 | | | |
102
Fig.3c
| i: | $ICF_{Ei,K}$: | $CF_{Ei,K}$: |
|---|---|---|
|   | $ICF_{E1,1}$ | |
| 1 | $ICF_{E1,2}$ | |
|   | $ICF_{E1,3}$ | |
|   | $ICF_{E2,1}$ | |
| 2 | $ICF_{E2,2}$ | |
|   | $ICF_{E3,3}$ | |
104
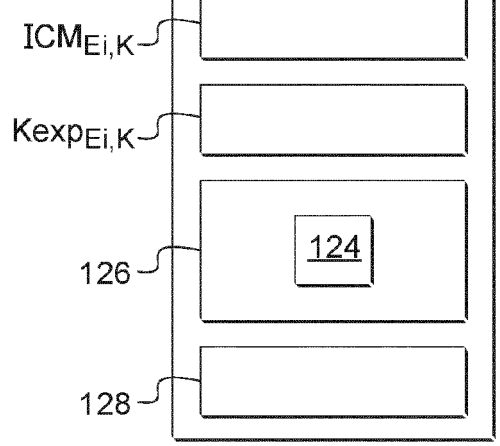
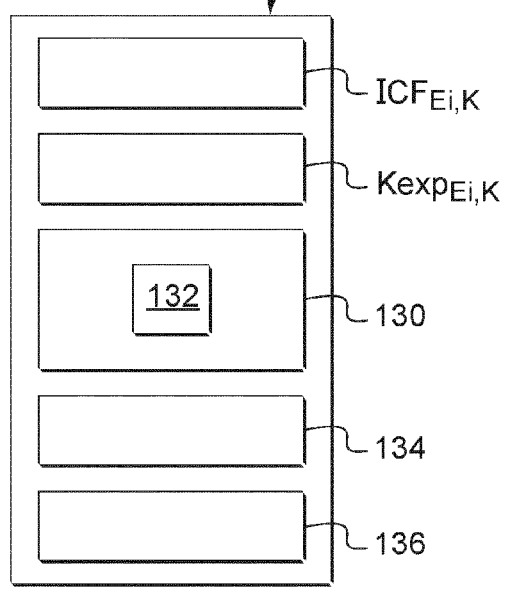
Fig.4

METHOD FOR TRANSMITTING AND RECEIVING A MULTIMEDIA CONTENT

CROSS REFERENCE TO RELATED APPLICATION

This application is the national phase under 35 USC 371 of international application no. PCT/EP2011/073148, filed Dec. 16, 2011, which claims the benefit of the priority date of French application no. 1061339, filed Dec. 29, 2010. The contents of the aforementioned applications are incorporated herein in their entirety.

FIELD OF DISCLOSURE

The invention pertains to a method for transmitting and receiving a multimedia content. The invention also pertains to a method for generating ECMs (Entitlement Control Messages) and a method for receiving ECMs. The invention finally pertains to a transmitter, a reception terminal and an information-recording medium for the implementing of these methods.

BACKGROUND

To secure the viewing of multimedia contents and subject this viewing to certain terms, such as taking out a paid subscription for example, the multimedia contents are broadcast in scrambled form and not in unencrypted or plain form. In this description, the channel is said to be "scrambled" when the multimedia content broadcast on this channel is scrambled.

More specifically, each multimedia content is divided into a succession of cryptoperiods. Throughout the duration of a cryptoperiod, the conditions of access to the scrambled multimedia content remain unchanged. In particular, throughout the duration of a cryptoperiod, the multimedia content is scrambled with the same control word. In general, the control word varies from one cryptoperiod to another.

Furthermore, the control word is generally specific to a multimedia content, this control word being drawn randomly or pseudo-randomly. Thus if at a given instant N multimedia contents are broadcast simultaneously on N channels, there are N different, independent control words, each used to scramble one of the multimedia contents.

Here, the terms "to scramble" and "to encrypt" are considered to be synonyms. This is also the case for the terms "to descramble" and "to decrypt".

The plain multimedia content corresponds to the multimedia content before it is scrambled. This content can be made directly comprehensible to a human being without resorting to operations of descrambling and without subjecting the viewing to certain terms and conditions.

The control words needed to descramble multimedia contents are transmitted in synchronism with the multimedia contents. For example, the control words needed to descramble the $t^{th}$ cryptoperiod are received by each terminal during the $(t-1)^{th}$ cryptoperiod. To this end, for example, the control words are multiplexed with the scrambled multimedia content.

To secure the transmission of the control words, these words are transmitted to the terminal in a form of cryptograms contained in ECMs. Here below, the term "cryptogram" designates a piece of information that is not enough on its own to retrieve the unencrypted or plain control word. Thus, if the transmission of the control word is intercepted, knowledge of the cryptogram of the control word alone cannot be used to retrieve the control word by which the multimedia content can be descrambled.

To retrieve the plain control word, i.e. the control word that can be used to directly descramble the multimedia content, this control word must be combined with a piece of secret information. For example, the cryptogram of the control word is obtained by encrypting the plain control word with an operating key and an encryption algorithm. In this case, the piece of secret information is the operating key used and/or an encryption algorithm enabling the cryptogram to be decrypted.

The piece of secret information must be kept in a secure place. To this end, it has already been proposed to store the piece of secret information in security processors such as smart cards or again virtual cards. The term "virtual card" designates a software component comprising a set of resources, among them:

the executed code of an encryption algorithm or a decryption algorithm, and the executable code of a syntax analyzer to locate a cryptogram of a control word within an ECM or the executable code of a syntax constructor to construct an ECM, and as the case may be, access titles, as the case may be, an operating key used as parameter of the encryption or decryption algorithm.

An executable code is a code that can be directly executed by an interpreter or virtual machine at a lower level implemented in a microprocessor. The encryption or decryption algorithm and the syntax analyzer typically form an executable program or several executable programs.

Here below, the term "virtual mother card" refers to a virtual card used to compute an ECM. The term "virtual daughter" designates a virtual card used to process a received ECM. A virtual mother card and a virtual daughter card are said to be associated with each other if the virtual daughter card enables the successful processing of a received ECM, computed by means of the virtual mother card.

In this context, a method for transmitting and receiving a multimedia content, each cryptoperiod $CP_t$ of which is scrambled by means of a respective control word $CW_t$, known to the filing party, comprises:

the encryption, by a sender, of the control word $CW_t$ by means of an operating key and a executable code of an encryption algorithm contained in the virtual mother card to obtain a cryptogram $CW_t^*$, the generation of an ECM (Entitlement Control Message) incorporating the cryptogram $CW_t^*$ by means of an executable code of a syntax constructor contained in the virtual mother card and the transmission of this ECM to a terminal, the reception of the ECM by the terminal, the locating of the position of the cryptogram $CW_t^*$ in the ECM received by means of an executable code of a syntax analyzer and then the decryption of the cryptogram $CW_t^*$ by means of an operating key of a decryption algorithm, the executable code of the syntax analyzer and the decryption algorithm being contained in a virtual daughter card associated with the virtual mother card, and the descrambling of the cryptoperiod $CP_t$ of the scrambled multimedia content by means of the decrypted control word $CW_t$.

The use of virtual cards enables the rapid and low-cost replacement of the secret information in the terminals. For example, the replacement of a virtual card enables the modification of the encryption and decryption algorithms used when a security breach has been discovered. However, the use of a virtual card in itself brings no gain in security as compared with the use of a smart card.

The prior art is also known from:
FR2922393A1,
EP1320006A1,
WO2009/112966A2, and
US2009/080648A1.

SUMMARY

The invention seeks to improve the security of methods of transmitting and receiving a multimedia content using virtual cards.

The invention can be applied especially in the field of access control for the providing of paid-for multimedia programs as in pay television.

In this description, the term "multimedia content" more specifically designates an audio and/or visual content designed to be rendered in a form that is directly perceptible and comprehensible to a human being. Typically, a multimedia content corresponds to a succession of images forming a film, a television broadcast or an advertisement. A multimedia content may also be an interactive content such as a game.

The invention thus pertains to a method for transmitting and receiving a multimedia content, each cryptoperiod $CP_t$ of which is scrambled by means of a respective control word $CW_t$, the method also comprising the steps of:

the changing, at least every two hours, by the sender, of the virtual mother card used to obtain the cryptogram $CW^*_{t+n}$ of a following cryptoperiod $CP_{t+n}$ of a same multimedia content, the new virtual mother card used being different from the preceding virtual mother card used by its operating key and at least the executable code of its encryption algorithm or of the syntax constructor, in response, the selection by the terminal, of the new virtual daughter card to be used to decrypt the cryptogram $CW^*_{t+n}$ so as to obtain the control word $CW_{t+n}$.

In the method shown here above, by changing the virtual mother and daughter cards at least every two hours, the variety of the keys and algorithms used is increased, thus making the retrieval of the secret information by an illegitimate user and the sharing of this information with other hacker users more complex. In particular, in the above method, the illegitimate retrieval of secret information is made more difficult, not only by the frequent changing of the operating key but also by the frequent changing of the encryption algorithm and/or the syntax constructor. For example, the illegitimate retrieval of the operating keys made more difficult because by changing the syntax constructor, the format of the ECM and for example the location of this key in an ECM is modified. As a result, it becomes more difficult for a computer pirate to accurately extract the cryptogram of this key from an ECM. The changing of the encryption algorithm makes the illegitimate retrieval of the operating key alone useless because it is also necessary to retrieve the encryption or decryption algorithm to be used with this key. The quantity of information to be illegitimately retrieved in order to accurately descramble a multimedia content is therefore increased. At the same time the frequency of the renewal of this information is also increased. The computer hackers' task is therefore made more complex and the security of the method for transmitting and receiving multimedia contents is therefore increased.

The embodiments of this method may comprise the following characteristics:
the new virtual mother card used differs from the previous virtual mother card used in the executable code of its decryption algorithm and of the syntax constructor.

The embodiments of this method have the following advantage:
the combined use of an encryption and decryption algorithm and a syntax constructor enable the encryption of a control word and makes it possible to vary the format of the ECM (for example the location of the cryptogram of the control word in the ECM) so as to make the decryption of this ECM more complex for an illegitimate user.

The invention also relates to a method for generating ECMs for the implementation of a method for transmitting and receiving multimedia contents, each ECM comprising a cryptogram $CW^*_t$ of a control word $CW_t$ used to scramble a respective cryptoperiod $CP_t$ of a same multimedia content, the method comprising:

a) the encryption of the control word $CW_t$ by means of an operating key and an executable code of an encryption algorithm contained in a virtual mother card to obtain the cryptogram $CW^*_t$, and b) the generating of an ECM incorporating the cryptogram $CW^*_t$ by means of an executable code of a syntax constructor contained in the virtual mother card and c) the changing at least every two hours, of the virtual mother card used to obtain the cryptogram $CW^*_{t+n}$ of a following cryptoperiod $CP_{t+n}$, the new virtual mother card used differing from the previous virtual mother card used in the operating key and at least the executable code of its encryption algorithm or syntax constructor.

The embodiments of this method may comprise one or more of the following characteristics:
the method comprises the transmission to the terminal, in an ECM, of an identifier of the virtual daughter card to be used to decrypt the cryptogram $CW_{t+n}^*$.
at the step c), the virtual mother card is selected from a set of virtual cards pre-recorded within the sender, the virtual cards belonging to this set being distinct from one another.
at the step c), the virtual mother card is selected pseudo-randomly from the set of virtual cards pre-recorded within the sender.

wherein:
the method comprises the selection, as a function of the multimedia content to be scrambled, of a set of several different virtual mother cards from among several sets of virtual mother cards, by means of a relationship associating, with each multimedia content, only one set of virtual mother cards, each virtual mother card belonging exclusively to a unique set, and the control words for scrambling a multimedia content are encrypted solely by means of virtual mother cards selected in the set associated with this content, so as to limit the access to the scrambled multimedia content solely to the reception terminals having available a set of virtual daughter cards corresponding to this set of virtual mother cards.

The embodiments of this method moreover comprise the following advantages:
- when the identifier of the virtual mother card is transmitted in an ECM, the frequency of change of one virtual card by another virtual card can be accelerated,
- when the virtual mother cards are pre-recorded, the switching time between a previous virtual mother card and a new virtual mother card is minimized at the sender level,
- when the virtual mother card is selected pseudo-randomly, the security of the method is increased by making it difficult for an illegitimate user to know in advance which associated virtual daughter card will be the card to be used in order to decrypt a subsequent cryptogram, and
- when all the virtual daughter cards are pre-recorded, the switching time between a previous virtual daughter card and a new virtual daughter card is minimized, at the terminal level.

The invention also pertains to a method of reception, through a terminal, for the implementation of the above method for transmitting and receiving, this method comprising:
e) the reception, by means of one or more ECMs, of a cryptogram $CW^*_t$ of the control word $CW_t$,
f) the locating of the position of the cryptogram $CW^*_t$ in an ECM received by means of a executable code of a syntax analyzer and then the decryption of the cryptogram by means of an operating key and an executable code of a decryption algorithm, the executable code of the syntax analyzer and the decryption algorithm being contained in a virtual daughter card associated with the virtual mother card, and the descrambling of a cryptoperiod $CP_t$ of the scrambled multimedia content by means of the decrypted control word $CW_t$, and
g) in response to a changing of virtual mother card by the sender, the selection by the terminal of the new virtual daughter card to be used for the decryption of the cryptogram $CW^*_t$ from a set of virtual daughter cards pre-recorded in the terminal so as to obtain the control word $CW_t$, each virtual daughter card being different from another virtual daughter card of the set in its operating key and at least the executable code of its encryption algorithm or of the syntax analyzer.

The embodiments of this method may comprise one or more of the following characteristics:
- the method comprises:
  - the reception of an identifier of a virtual daughter card during the step e), and
  - the selection by the terminal of the virtual daughter card from the set of pre-recorded cards on the basis of the identifier received during the step g).
- the method also comprises:
  - the reception by the terminal, during the step e), of one or more additional instructions, and
  - in response, the modification of the executable code of the virtual daughter card selected by completing and/or replacing only one part of the instructions of the executable code of this virtual daughter card by the received instruction or instructions.
- the method comprises:
h) the reception by the terminal of an encrypted virtual daughter card,
i) the storage of the received encrypted virtual daughter card to add this card to the set of pre-recorded virtual daughter cards, and
j) the decryption of the encrypted virtual daughter card in response to the reception of the identifier,
the steps h), i) and j) being executed before the implementation of the steps e) and g).

The embodiments of this method furthermore comprise the following advantages:
- when the method comprises the mechanism of additional instructions as presented further above, the method is further secured.

The method finally pertains to an information-recording medium comprising instructions for the execution of one of the methods presented further above, when these instructions are executed by an electronic computer.

The invention also pertains to a transmitter for the implementing of a method for generating ECMs, the transmitter comprising:
- a scrambler to scramble a respective cryptoperiod $CP_t$ of a multimedia content by means of a control word $CW_t$,
- a system to encrypt the control word $CW_t$ by means of an operating key and an executable code of an encryption algorithm contained in a virtual mother card to obtain the cryptogram $CW^*_t$, and to generate an ECM incorporating the cryptogram $CW^*_t$ by means of an executable code of a syntax constructor contained in the virtual mother card, wherein the system is programmed to change the virtual mother card used, at least every two hours, in order to obtain the cryptogram $CW^*_{t+n}$ of a following cryptoperiod $CP_{t+n}$, the new virtual mother card used differing from the previous virtual mother card used in the operating key and at least in the executable code of its encryption algorithm or of the syntax constructor.

The invention finally pertains to a reception terminal comprising:
- a set of pre-recorded virtual daughter cards,
- a receiver to receive, by means of one or more ECMs, a cryptogram $CW^*_{t+n}$ of the control word $CW_{t+n}$, and
- an integrated circuit programmed to:
  - locate the position of the cryptogram $CW^*_t$ in the ECM received by means of an executable code of a syntax analyzer, and then decrypt this cryptogram by means of an operating key and an executable code of a decryption algorithm, the executable code of the syntax analyzer and of the decryption algorithm being contained in a virtual daughter card associated with a virtual mother card, and
  - descramble the cryptogram $CP_t$ of the multimedia content scrambled by means of the decrypted control word $CW_t$, and
  - in response to a change of virtual mother card by the sender, select a new virtual daughter card to be used for the decryption of the cryptogram $CW^*_{t+n}$ in the set of pre-recorded virtual daughter cards so as to obtain the control word $CW_{t+n}$, each virtual daughter card differing from another virtual daughter card of the set in its operating key and at least in the executable code of its encryption algorithm or of the syntax analyzer.

BRIEF DESCRIPTION OF THE FIGURES

Other features and advantages of the invention shall appear more clearly from the description given here below by way of an indication that is in no way exhaustive, with reference to the appended drawings, of which:

FIG. 2 is a schematic illustration of a computation module for the sending system of FIG. 1, FIG. 3 is a schematic illustration of an integrated circuit for the sending system of FIG. 1, FIGS. 3a, 3b and 3c are schematic illustrations of data bases and of a table pre-recorded in integrated circuit memories of FIG. 3, FIG. 4 is a schematic illustration of a virtual mother card and of a virtual daughter card that are associated.

In these figures, the same references are used to designate the same elements.

DETAILED DESCRIPTION

Here below in this description, the characteristics and functions well known to those skilled in the art are not described in detail.

In addition, the terminology used is that of conditional access systems for access to multimedia contents. For more information on this terminology, the reader may refer to the following document: "Functional Model of Conditional Access System", EBU Review, Technical European Broadcasting Union, Brussels, BE, no 266, 21 Dec. 1995.

Figure 1:
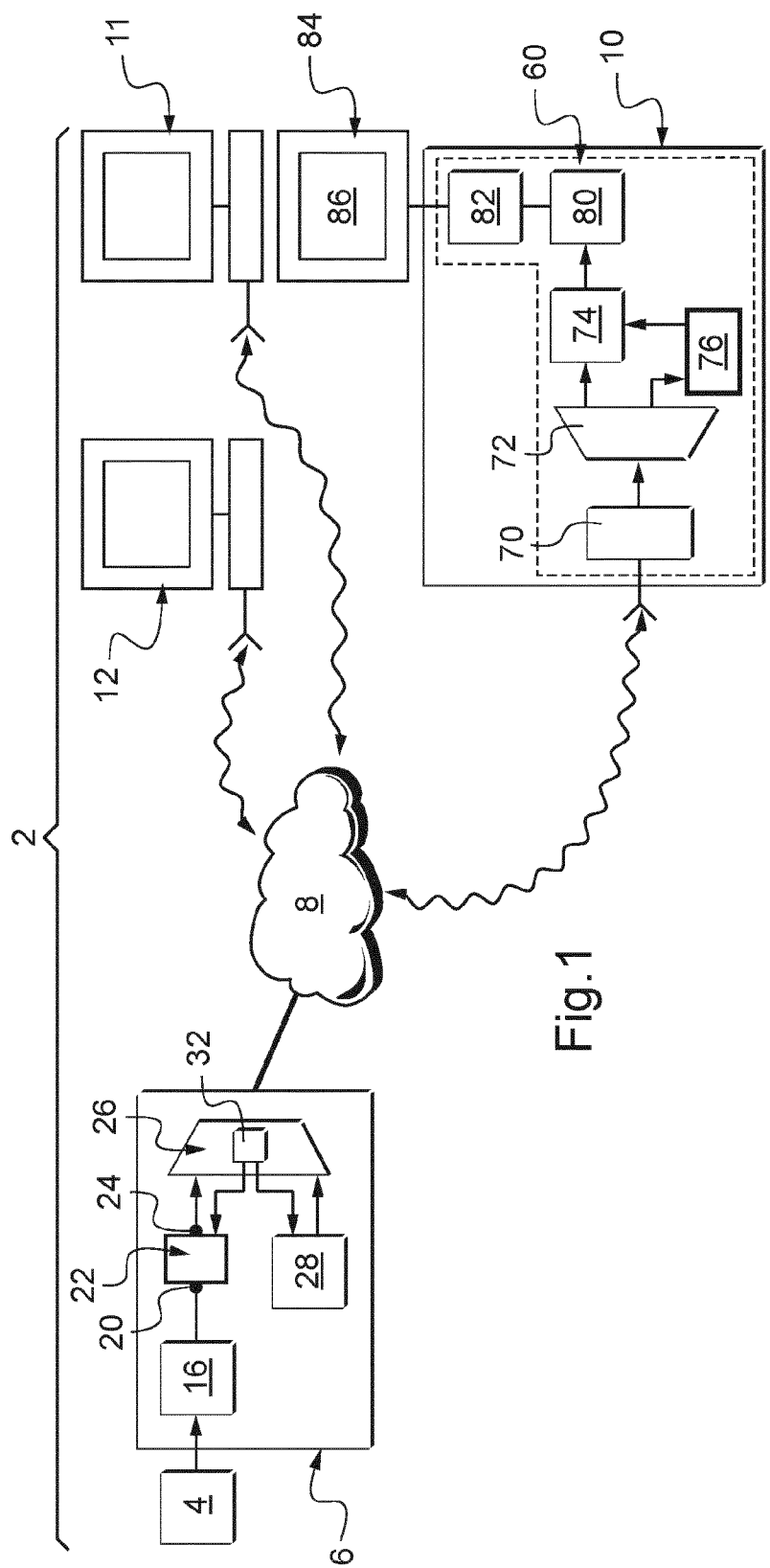
FIG. 1 is a schematic illustration of a system for sending and receiving scrambled multimedia contents.

FIG. 1 shows a system 2 for sending and receiving scrambled multimedia contents. Here, the multimedia contents are linearized. The term <<"linearized multimedia content" designates a multimedia content for which the user does not control the instant of transmission. For example, a multimedia content corresponds to a sequence of an audiovisual program such as a television broadcast or a film.

The plain multimedia contents are generated by one or more sources 4 and transmitted to a broadcasting device 6. The broadcasting device 6 broadcasts the multimedia contents simultaneously to a multitude of reception terminals through an information-transmission network 8. The broadcast multimedia contents are synchronized in time with one other so as to, for example, comply with a pre-set program schedule.

The network 8 is typically a long-distance information transmission network such as the Internet or a satellite network or any other broadcasting network such as the one used for the transmission of digital terrestrial television (DTTV).

To simplify FIG. 1, only three reception terminals 10 to 12 have been shown.

The device 6 comprises an encoder 16 which compresses the multimedia contents that it receives. The encoder 16 processes the digital multimedia contents. For example, this encoder works according to the MPEG2 (moving picture expert group-2) standard or the UIT-T H264 standard.

The multimedia contents said to be compressed are sent to an input 20 of a scrambler 22. The scrambler 22 scrambles each compressed multimedia content so as to make its viewing conditional on certain terms such as the purchase of an access title by the users of the reception terminal. The scrambled multimedia contents are rendered at an output 24 connected to the input of a multiplexer 26. The scrambler 22 scrambles each compressed multimedia content by means of a control word $CW_{i,t}$ which is provided to it by generator 32 of control words $CW_{i,t}$. Typically, the scrambling is compliant with a standard such as the DVB-CSA (digital video broadcasting-common scrambling algorithm), ISMA Cryp (Internet streaming media alliance Cryp), SRTP (secure real-time transport protocol), AES (advanced encryption standard), . . . etc.

The generator 32 is programmed to:
generate a control word $CW_{i,t}$, and
transmit a generated control word to the scrambler 22 and to a system 28.

In this example, the generator 32 pseudo-randomly generates a control word $CW_{i,t}$. Here the generator 32 is included in the multiplexer 26.

Here below, the index i is an identifier of the channel on which the scrambled multimedia content is broadcast and the index t is an order number identifying the cryptoperiod scrambled with this control word.

The system 28 is a system better known by the acronym CAS (Conditional Access System). The system 28 is programmed to:
generate a cryptogram $CW^*_{i,t}$ of a control word $CW_{i,t}$, transmitted by the generator 32, and
generate, for each channel I, a message $ECM_{i,t}$ (Entitlement Control Message) containing at least the cryptogram $CW^*_{i,t}$ of the control word $CW_{i,t}$ used by the scrambler 22 to scramble the cryptogram t of the channel i.

These messages $ECM_{i,t}$ and the scrambled multimedia contents are multiplexed by the multiplexer 26 and then transmitted on the network 8.

The system 28 is described further below with reference to FIG. 2.

The ECM containing the control word $CW_{i,t}$ is denoted as $ECM_{i,t}$ here below in the description where:
the index i identifies the channel, and
the index t is an order number identifying the temporal position of this ECM relatively to the other different ECMs sent in order to descramble the channel Here, the index t also identifies the cryptoperiod $CP_{i,t}$ that can be descrambled by means of the control word $CW_{i,t}$ contained in the message $ECM_{i,t}$. The index t is unique for each cryptoperiod $CP_{i,t}$.

The same identifier i is inserted into all the messages $ECM_{i,t}$ containing a cryptogram $CW^*_{i,t}$ to descramble multimedia contents broadcast on this channel i. By way of an illustration, here the scrambling and the multiplexing of the multimedia contents complies with the DVB-Simulcrypt (ETSI TS 103 197) protocol. In this case, the identifier i may correspond to a single "channel ID/stream ID" pair on which all the requests for generating ECMs for this channel are sent.

In the example, the terminals 10 to 12 are identical. Thus, here below, only the terminal 10 is described in greater detail.

The terminal 10 is herein described in the particular case where it is capable of simultaneously descrambling a single channel i. To this end, the terminal 10 has a single descrambling line 60 to descramble the channel i. For example, the line 60 descrambles the channel i to display it on a display unit 84.

For example, the display unit 84 is a television set, a computer or again a landline telephone or a cell phone. Here, the display unit is a television set.

The line 60 has a receiver 70 of broadcast multimedia contents. This receiver 70 is connected to the input of a demultiplexer 72 which transmits, on the one hand, the multimedia content to a descrambler 74 and, on the other hand, the message $ECM_{i,t}$ and the EMM (entitlement management message) to an integrated circuit 76.

The circuit 76 is capable of decrypting a cryptogram $CW^*_{i,t}$ of a control word $CW_{i,t}$ contained in the message $ECM_{i,t}$, and providing this control word to the descrambler 74. The circuit 76 is described in detail further below with reference to FIG. 3.

The descrambler 74 descrambles the scrambled multimedia content through the control word transmitted by the processor 76. The descrambled multimedia content is transmitted to a decoder 80 which decodes it. The decompressed or decoded multimedia content is transmitted to a graphic card 82 which drives the display of this multimedia content on the display unit 84 equipped with a screen 86. The display unit 84 displays the multimedia content in plain form on the screen 86.

The system 28 shall now be described with reference to FIG. 2.

The system 28 comprises a non-volatile memory 36. The memory 36 contains data bases 38 and 42.

The data base 38 is a relationship associating, with each i, a set $E_i$ of virtual mother cards $CM_{Ei,k}$, where the index $E_i$ identifies the set to which the virtual card $CM_{Ei,k}$ belongs and k is an integer. Each virtual mother card $CM_{Ei,k}$ is identified by an identifier $ICM_{Ei,k}$ proper solely to this virtual mother card. In order to simplify FIG. 1, the data base 28 is illustrated for only two channels 1 and 2. The sets $E_1$ and $E_2$ comprise three pre-recorded virtual mother cards, respectively $CM_{E1,1}$, $CM_{E1,2}$, $CM_{E1,3}$, et $CM_{E2,1}$, $CM_{E2,2}$, $CM_{E2,3}$.

The virtual mother cards belonging to a same set are distinct. Preferably, a virtual mother card belonging to a set $E_i$ belongs exclusively to this set $E_i$. Thus, two virtual mother cards belonging to two distinct sets $E_i$ are necessarily distinct. A definition of the term "distinct" is given here below with reference to FIG. 4.

The structure of the virtual mother cards is common to all the virtual mother cards. The structure is presented further below with reference to FIG. 4.

The data base 42 contains "software patches". The term "software patch" designates a set of portions of code comprising at least one instruction, designed to complement or replace a part of the executable code of a virtual mother or daughter card. This replacement does not require any recompilation of the modified code. Typically, a patch is constituted by one or more code vectors (or series of bytes) of variable length, each associated with a targeted address (or starting position) in the code (contiguous memory zone) to be replaced. Ultimately, this is a list of modifications to be made on the code block.

Here below, the term "mother patch" designates a patch designed to be applied to the code of a virtual mother card. The term "daughter patch" designates a patch designed to be applied to a code of a virtual daughter card.

For example, a patch contains an instruction defining a number of iterations for an encryption or decryption algorithm.

In the example, the memory size of a software patch is smaller than 10 ko and preferably smaller than 5 ko so that it can be transmitted by means of an ECM and/or an EMM.

The data base 42 associates, with a mother patch $PM_j$, a corresponding daughter patch $PF_j$, where j is an integer. In order to simplify FIG. 1, the data base 42 in this example has three pairs of mother/daughter patches.

The memory 36 is herein a flash-type memory.

The system 28 also has a processor 46 capable of:
pseudo-randomly selecting a virtual mother card $CM_{Ei,k}$ from a set $E_i$ of cards in the data base 38,
pseudo-randomly selecting a mother patch $PM_j$ in the data base 42, and
generating a cryptogram $CW^*_{i,t}$ of a control word $CW_{i,t}$ generated by the generator 32 from a selected virtual mother card $CM_{Ei,k}$ and a selected mother patch $PM_j$.

Furthermore, the processor 46 is capable of generating a message $ECM_{i,t}$ incorporating:
a generated cryptogram $CW^*_{i,t}$,
an identifier of a virtual daughter card to be used to decrypt the cryptogram $CW^*_{i,t}$,
a daughter patch $PF_J$ associated with a selected mother patch $PM_j$, and
a signature or a MAC (message authentication code) cryptographic redundancy used to verify the integrity of the ECM.

For example, the processor 46 is made out of a programmable electronic computer. This computer is capable of executing instructions recorded on an information recording medium so as to implement the method of FIG. 5. For example, these instructions are also recorded in the memory 36.

The circuit 76 shall now be described with reference to FIG. 3.

The circuit 76 is better known as an SoC (System On a Chip). Here, the circuit 76 preferably is also a secured integrated circuit. The use of secured integrated circuits is well-known to those skilled in the art. For a detailed description of an example of a secured integrated circuit, reference may be made to the US patent application US20050169468. Here, the circuit 76 comprises:
a non-volatile memory 90,
a volatile memory 92, and
a processor 96.

The memory 90 contains a data base 100 (which can be seen more clearly in FIG. 3a). This base 100 associates with an identifier $ICF_{Ei,k}$ of a daughter card $CF_{Ei,k}$, a cryptogram $CF^*_{Ei,k}$ of this virtual daughter card $CF_{Ei,k}$. Each code cryptogram $CF^*_{Ei,k}$ of a virtual daughter card is obtained here by encrypting the executable code of a virtual daughter card $CF_{Ei,k}$ with a key $K\_CF_{Ei,k}$.

Advantageously, for each virtual mother card with an identifier $ICM_{Ei,k}$ pre-recorded in the memory 36, there is at most one cryptogram of a code $CF^*_{Ei,k}$ pre-recorded in the base 100 associated with the identifier $ICF_{Ei,k}$. Thereby, emphasis is placed on the characteristic wherein there are pre-recorded mother cards in the memory 36 for which no cryptogram of the code of the associated virtual daughter card is pre-recorded in the base 100.

In order to simplify FIG. 3a, the data base 100 contains only three cryptograms of the code of the virtual daughter cards $CF^*_{E1,1}$, $CF^*_{E1,2}$ and $CF^*_{E1,3}$, associated respectively with the identifiers $ICF_{E1,1}$, $ICF_{E1,2}$ and $ICF_{E1,2}$.

Here, the data base 100 does not include the cryptograms of the code of the virtual daughter cards $CF^*_{E2,1}$, $CF^*_{E2,2}$ and $CF^*_{E2,3}$.

The structure of a virtual daughter card is common to all the virtual daughter cards. This structure is described in detail further below with reference to FIG. 4.

The memory 90 also contains a data base 102 (more visible in FIG. 3b). This data base 102 associates the following with a channel i and an identifier $ICF_{Ei,k}$:
the key $K\_CF_{Ei,k}$ to decrypt the cryptogram $CF^*_{Ei,k}$ of a virtual daughter card $CF_{Ei,k}$, and
a key $Ksign\_CF_{Ei,k}$ to verify the authenticity of the virtual daughter card $CF_{Ei,k}$.

In the example, the data base 102 comprises:
the key $K\_CF_{E1,1}$, $K\_CF_{E1,2}$, $K\_CF_{E1,3}$, and
the keys $Ksign\_CF_{E1,1}$, $Ksign\_CF_{E1,2}$, and $Ksign\_CF_{E1,3}$.

The memory 92 contains a table 104 (which can be seen more clearly in FIG. 3c) associating, with and identifier $ICF_{Ei,k}$, an address of a virtual daughter card $CF_{Ei,k}$ memorized in the memory 90. The virtual daughter cards $CF_{Ei,k}$ memorized in the memory 90 are preferably secured. The term "secured" herein designates the fact that the executable codes of the virtual daughter cards are obscured so that they cannot be executed as such. For example, a part of the executable code is encrypted to make any reverse-engineering attempt inoperative. In the example, the table 104 is blank. This designates the characteristic according to which the table has no secured virtual daughter card address $CF_{Ei,k}$.

The processor 96 is herein programmable electronic computer. The processor 96 is capable of executing instructions recorded on an information-recording support to implement the method of FIG. 6. The processor 96 has a security coprocessor 97. This coprocessor 97 is herein programmed to:
secure (obscure or as in this case encrypt) the data stored in the memory 92, and
restore (in this case decrypt) the pieces of data stored in the memory 92 so as to make them exploitable by the processor 96.

In the example, the coprocessor 97 contains a write-once non-volatile memory 94. The memory 94 contains a key $K_{chip}$ proper to the terminal 10. This key is for example etched during the manufacture of the integrated circuit 76.

A virtual mother card 120 and a virtual daughter card 122 associated with each other shall now be described with reference to FIG. 4.

The virtual mother card 120 and daughter card 122 are software libraries. Typically, the virtual mother card 120 and daughter card 122 are DLL (Dynamic Link Library) type libraries, containing their executable code.

The virtual mother card 120 comprises:
an identifier $ICM_{Ei,k}$,
an exploitation key $Kexp_{Ei,k}$,
an encryption algorithm 126 using the exploitation key $Kexp_{Ei,k}$ to encrypt the control word $CW_{i,t}$ and obtain the cryptogram $CW^*_{i,t}$, and
a syntax constructor 128 to format the ECM and position the cryptogram of the control word $CW_{i,t}$ as well as the other parameters (such as the conditions of access) in the $ECM_{i,t}$, and to do so in a manner that is consistent with the syntax constructor of each associated virtual daughter card.

The encryption algorithm and the syntax constructor form a code designed to be executed by the processor 46.

In the example, the encryption algorithm comprises a missing code portion 124. This portion 124 is designed to receive a mother software patch. In the example, the portion 124 is only one part of the algorithm 126 and not the entire algorithm 126.

Furthermore, in this description, the term "distinct virtual mother cards" designates two virtual cards which differ from one another in their operating key $Kexp_{Ei,k}$ and/or in their encryption algorithm 126 and/or in their syntax constructor 128.

The virtual daughter card 122 comprises:
an identifier $ICF_{Ei,k}$,
the operating key $Kexp_{Ei,k}$,
a decryption algorithm 130 using the operating key $Kexp_{Ei,k}$ to decrypt the cryptogram $CW^*_{i,t}$ encrypted from the mother card 120 and obtain the control word $CW_{i,t}$, a syntax analyzer 134 to localize the cryptogram $CW^*_{i,t}$ in a message $ECM_{i,t}$, and
a signature 136 to verify the integrity of the virtual daughter card 122.

The encryption algorithm and the syntax analyzer form a code designed to be executed by the processor 96.

The term "distinct virtual daughter cards" designates two virtual daughter cards differing from each other in their operating key and/or their decryption algorithm and/or their syntax analyzer.

A method for transmitting a scrambled multimedia content in the system of FIG. 1 shall now be described with reference to FIG. 5. The method implemented is the same for each channel. Thus, we describe here below the method of transmission in the particular case of the channel 1.

At a step 200 implemented at an instant t, the source 4 transmits a cryptoperiod $CP_{1,t}$ in plain form from the channel 1 to the encoder 16. In the example, a cryptoperiod has a duration ranging from five seconds to one minute. Typically, the duration of a cryptogram is 10 seconds.

At a step 202, the encoder 16 encodes the cryptoperiod $CP_{1,t}$ and transmits the encoded cryptoperiod to the scrambler 22.

At a step 204, the generator 32 selects a control word $CW_{1,t}$ and transmits this control word to the scrambler 22. More specifically, the generator 32 pseudo-randomly selects a control word $CW_{1,t}$ and transmits this control word $CW_{1,t}$ to the scrambler 22 and to the system 28.

At a step 206, the scrambler 22 scrambles the cryptoperiod $CP_{1,t}$ encoded at the step 202, from the control word $CW_{1,t}$ received at the step 204. The scrambler 22 thus generates a scrambled cryptoperiod $CP^*_{1,t}$. The scrambler 22 transmits the scrambled cryptoperiod $CP^*_{1,t}$ to the multiplexer 26.

At a step 208, the system 28 generates the different pieces of information needed to build the message $ECM_{1,t}$ and this enables the descrambling of the cryptoperiod $CP^*_{1,t}$.

More particularly, in an operation 210, the processor 46 selects the set $E_1$ of mother cards associated with the channel 1 through the data base 38. Then, in the data base 38, it pseudo-randomly selects a virtual mother card $CM_{1,k}$ from the virtual mother cards $CM_{1,1}$, $CM_{1,2}$, and $CM_{1,3}$ of the set $E_1$. For example, the processor 46 selects the virtual mother card $CM_{1,1}$.

At an operation 212, the processor 46 pseudo-randomly selects, in the data base 42, a mother patch $PM_j$ from the mother patches $PM_1$, $PM_2$, and $PM_3$. For example, the processor 46 selects the mother patch $PM_1$.

At an operation 214, the processor 46 completes the missing code portion 124 of the encryption algorithm 126 of the virtual card $CM_{1,1}$ selected during the operation 210 with a mother patch $PM_1$ selected during the operation 211. The encryption algorithm formed during this step 214 is hereinafter called an "operational encryption algorithm".

At an operation 216, the processor 46 generates the cryptogram $CW^*_{1,t}$ of the word $CW_{1,t}$ from:
the operational encryption algorithm formed during the operation 214, and
the operating key $Kexp_{E1,1}$ contained in the mother card $CM_{E1,1}$ selected,
the control word $CW_{1,t}$ provided by the generator 32.

At the operation 217, the processor 46 executes the syntax constructor of the virtual mother card $CM_{E1,1}$ to determine the location in the frame of the message $ECM_{1,t}$ at which the cryptogram $CW^*_{1,t}$ must be inserted.

At a step 220, the system 28 generates a message $ECM_{1,t}$ containing:
- the identifier $ICF_{E1,1}$ of the virtual mother card $CM_{E1,1}$ associated with the virtual mother card $CM_{E1,1}$,
- the daughter patch $PF_1$,
- the cryptogram $CW^*_{i,t}$ of the control word $CW_{i,t}$ enabling the descrambling of the cryptoperiod t of the channel 1, and
- a MAC cryptographic redundancy.

At this step 220, the system 28 places the cryptogram $CW^*_{i,t}$ in the frame of the message $ECM_{1,t}$ at the location determined during the operation 217.

At a step 222, the generator 28 transmits the message $ECM_{1,t}$ to the multiplexer 26.

At a step 224, the multiplexer 26 multiplexes the scrambled cryptoperiod $CP^*_{1,t}$ formed at the step 206 and the message $ECM_{1,t}$ transmitted at the step 222.

More specifically, the message $ECM_{1,t}$ is inserted into the signal by the multiplexer 26 before the cryptoperiod $CP_{1,t}$.

The steps 200 to 224 are reiterated for each cryptoperiod. Consequently, here the virtual mother card is changed every cryptoperiod.

A method for the reception of a scrambled multimedia content by the terminal 10 shall now be described with reference to FIG. 6.

At a preliminary stage 300, a user of the terminal 10 takes out a subscription with a multimedia content provider. For example, the provider offers the possibility of viewing the channels 1 and 2. More particularly, here the user pays a fee to be able to view only the channel 1 in plain mode.

In response, the operator delivers only the data needed for the user to be able to descramble the channel 1.

At a step 302, the device 6 encrypts the virtual daughter cards $CF_{E1,1}$, $CF_{E1,2}$, and $CF_{E1,3}$ associated with the virtual mother cards $CM_{E1,1}$, $CM_{E1,2}$, and $CM_{E1,3}$ of the set E1, respectively by means of the keys $K\_CF_{E1,1}$, $K\_CF_{E1,2}$ and $K\_CF_{E1,3}$ so as to obtain code cryptograms $CF^*_{E1,1}$, $CF^*_{E1,2}$, and $CF^*_{E1,3}$ of the virtual daughter cards.

At a step 304, the device 6, by means of one or more EMMs, transmits:
- the code cryptograms $CF^*_{E1,1}$, $CF^*_{E1,2}$, and $CF^*_{E1,3}$,
- the identifiers $ICF_{E1,1}$, $ICF_{E1,2}$, and $ICF_{E1,3}$ of the virtual daughter cards $CF_{E1,1}$, $CF_{E1,2}$, and $CF_{E1,3}$,
- the keys $K\_CF_{E1,1}$, $K\_CF_{E1,2}$ and $K\_CF_{E1,3}$ to enable the terminal 10 to decrypt the cryptograms $CF^*_{E1,1}$, $CF^*_{E1,2}$, and $CF^*_{E1,3}$, and
- the keys $Ksign\_CF_{E1,1}$, $Ksign\_CF_{E1,2}$ and $Ksign\_CF_{E1,3}$ to enable the terminal 10 to verify the authenticity of the virtual daughter cards $CF_{E1,1}$, $CF_{E1,2}$, and $CF_{E1,3}$.

The keys $K\_CF_{E1,1}$, $K\_CF_{E1,2}$ $_{an}$ and $_d K\_CF_{E1,3}$, and the keys $Ksign\_CF_{E1,1}$, $Ksign\_CF_{E1,2}$ and $Ksign\_CF_{E1,3}$ are advantageously encrypted preliminarily by means of the key $K_{chip}$.

At a step 306, the terminal 10 receives the EMM or EMMs transmitted by the device 6 and pre-records the content of this message or these messages in the memories 90 and 92 to form the data bases 100, 102.

When the preliminary phase 300 is completed, the data bases 100, 102 and the table 104 in memory 90 and 92 are as shown in FIGS. 3a, 3b and 3c.

At a stage 307 of use, the user wishes to use a multimedia content. For example, the user wishes to watch a film on the channel 1 at the instant t.

To this end, at a step 308, the terminal 10 gets connected to the network 8 and receives a multimedia content multiplexed by means of the receiver 70. This multiplexed content is demultiplexed by the demultiplexer 72. The demultiplexer 72 transmits the scrambled cryptoperiod $CP^*_{1,t}$ to the descrambler 74 and the message $ECM_{1,t}$ to the processor 96.

It may be recalled that the message $ECM_{1,t}$ contains:
- the identifier $ICF_{E1,1}$ of the virtual daughter card $CF_{E1,1}$,
- the daughter patch $PF_1$,
- the cryptogram $CW^*_{1,t}$, and
- a MAC cryptographic redundancy.

At a step 309, the processor 96 checks the integrity of the message $ECM_{1,t}$ received by recomputing the MAC cryptographic redundancy of this message $ECM_{1,t}$ and comparing the result obtained with the MAC cryptographic redundancy contained in the message $ECM_{1,t}$ received. If the result of the computation coincides with the MAC cryptographic redundancy contained in the message $ECM_{1,t}$ received, then the invention proceeds to a step 310. If not, the method is interrupted.

At a step 310, the processor 96 retrieves the identifier $ICF_{E1,1}$ in the received message $ECM_{1,t}$.

At a step 312, the processor 96 makes a check in the data base 104, using the identifier $ICF_{E1,1}$ received, to see if it already has the virtual daughter card $CF_{E1,1}$ to decrypt the cryptogram $CW^*_{1,t}$ contained in the message $ECM_{1,t}$. If the base 104 comprises the virtual daughter card $CF_{E1,1}$ then the invention proceeds directly to a step 314. Indeed, in this case, it is not necessary to decrypt the cryptogram $CF^*_{E1,1}$ to obtain the card $CF_{E1,1}$ in plain form. If not, the operation proceeds to a step 315.

At a step 315, the processor 96 makes a check in the data base 100 to see if it contains the identifier $ICF_{E1,1}$. If the answer is yes, it means that the terminal contains the cryptogram $CF^*_{E1,1}$ and that it is therefore permitted to display the channel 1.

The operation then proceeds to a step 326.

If the data base 104 does not contain the cryptogram $CF^*_{E1,1}$ then the processor 96 cannot decrypt the cryptogram $CW^*_{1,t}$. Thus, the user is not authorized to view the channel 1 in plain form and the reception method comes to an end.

At the step 326, the processor 96 decrypts the keys $K\_CF_{E1,1}$ and $Ksign\_CF_{E1-1}$ associated with the identifier $ICF_{E1,1}$ in the base 102 by means of the key $K_{chip}$. Then, the processor 96 decrypts the cryptogram $CF^*_{E1,1}$ from the key $K\_CF_{E1,1}$ so as to obtain a decrypted virtual daughter card $CF_{E1,1}$.

At a step 328, the processor 96 verifies the signature of the decrypted virtual daughter card $CF_{E1,1}$ using the key $Ksign\_CF_{E1,1}$. For example, the processor 96 applies a hash function, on the virtual card $CF_{E1,1}$ to obtain a first imprint of this card. Then, it decrypts the signature 136 of the card $CF_{E1,1}$ with the public key $Ksign\_CF_{E1,1}$ to obtain a second imprint. If the first and second imprints correspond, then the card $CF_{E1,1}$ is accurately authenticated.

In this case, at a step 330, the processor 96 interrogates the memory 92 to know its available memory space. If the memory 92 has sufficient memory space, the virtual daughter card $CF_{E1,1}$ decrypted during the step 326, is secured by the coprocessor 97, copied into the memory 90, listed in the data base 104 at a step 332 and associated with the identifier $ICM_{E1,1}$. The term "listed" designates an operation during which the memory address to which the virtual daughter card $CF_{E1,1}$ is copied is associated with the identifier $ICF_{E1,1}$ in the data base 104. If not, at a step 334, the memory 92 eliminates one of the virtual cards $CF_{Ei,k}$ from the base 104 to be able to receive the virtual daughter card $CF_{E1,1}$. For example, here the LRU (least recent used) algorithm is applied. The oldest used virtual daughter card in the memory 90 is first of all eliminated. Then, the virtual daughter card $CF_{E1,1}$ is secured by the coprocessor 97, copied to the memory 90 and then listed.

Once the step 332 or 334 has been completed, the operation proceeds to the step 314.

If the signature computed during the step 328 does not coincide with the signature 136 contained in the virtual card decrypted during the step 326, then the virtual card $CF_{E1,1}$ is not authenticated. In this case, the processor 96 does not decrypt the cryptogram $CW^*_{1,t}$ and the reception method is interrupted.

At the step 314, the processor 96 executes the syntax analyzer of the virtual daughter card $CF_{E1,1}$ and extracts the cryptogram $CW^*_{1,t}$ and the daughter patch $PF_1$ from the message $ECM_{1,t}$.

At a step 316, the processor 46 applies the daughter patch $PF_1$ extracted at the step 314 to the decryption algorithm of the virtual daughter card $CF_{1,1}$. The decryption algorithm formed during this step 316 is here below called the "operational decryption algorithm".

At a step 318, the processor 96 decrypts the cryptogram $CW^*_{1,t}$ from the operational decryption algorithm formed during the step 316 and the operating key $Kexp_{E1,1}$ contained in the virtual daughter card $CF_{E1,1}$. Thus, at this step 318, the processor 96 obtains the control word $CW_{1,t}$ in clear form.

At a step 320, the processor 96 transmits the control word $CW_{1,t}$ in clear form to the descrambler 74.

At a step 322, the descrambler 74 descrambles the scrambled cryptoperiod $CP^*_{1,t}$ from the control word $CW_{1,t}$ transmitted by the processor 96 and obtains a descrambled cryptoperiod $CP_{1,t}$. The descrambled cryptoperiod $CP_{1,t}$ is then transmitted to the decoder 80.

At a step 324, the decoder 80 decodes the cryptogram $CP_{1,t}$ and then transmits the result of the decoding to the graphic card 82. The graphic card 82 then drives the display of this result on the screen 86.

The steps 308 to 334 are reiterated for each cryptoperiod.

Many other embodiments are possible.

For example, the mother cards are not necessarily prerecorded in the memory 36. The virtual mother cards may be generated dynamically by the processor 46 during the preliminary phase 300 before the associated virtual daughter cards are transmitted.

In one variant, the selection by the terminal 10 of a virtual daughter card to be used to decrypt a cryptogram $CW^*_t$ consists of the dynamic generation of the virtual card by the processor 96 from a function pre-recorded in the memory 90 and from the identifier $ICF_{Ei,k}$ received.

In another variant, the syntax of the ECMs is always the same. In this case, the virtual mother and daughter cards comprise respectively always the same syntax constructor and the same syntax analyzer.

Again as a variant, the mother and daughter software patches can be applied respectively to the codes of the syntax constructor and the syntax analyzer of the virtual cards.

As a variant, with a virtual mother card or a set $E_i$ of virtual mother cards, the invention associates a specific set of mother patches proper solely to this card or to this set $E_i$.

Again as a variant, the mother and/or daughter patches are directly stored in the virtual mother and daughter cards respectively.

Again as a variant, the mother and daughter software patches may be omitted. In this case, the encryption and decryption algorithms of the virtual mother and daughter cards no longer comprise any missing code part 124 and 132.

In another variant, there is no set $E_i$ of virtual mother cards specific to this channel i. For example, there is a single set E for all the channels. In this case, all the virtual cards of this set can be used to encrypt a control word used to scramble a cryptoperiod of one of the channels i. Preferably, in order to restrict the access to certain channels to users having access titles, conditions of access are incorporated into the ECMs transmitted by the device 6. These conditions of access and the access titles recorded in the virtual daughter card are compared during the reception of an ECM in order to determine whether the processor can decrypt or not decrypt the cryptogram incorporated into this ECM.

Figure 5:
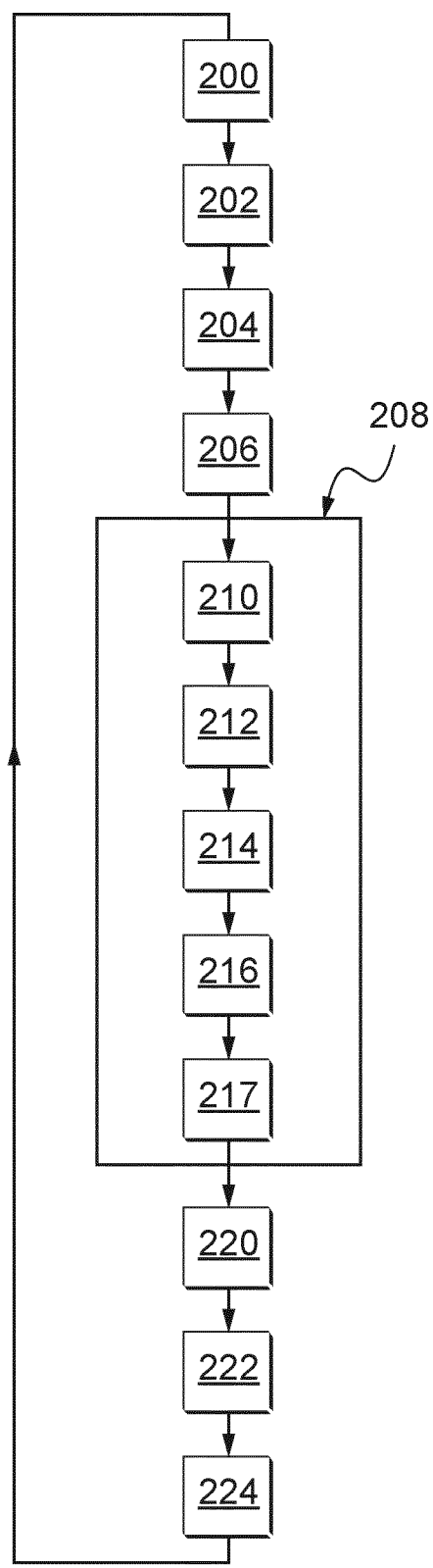
FIG. 5 is a flowchart of a method for transmitting a scrambled multimedia content in the system of FIG. 1.
Figure 6:
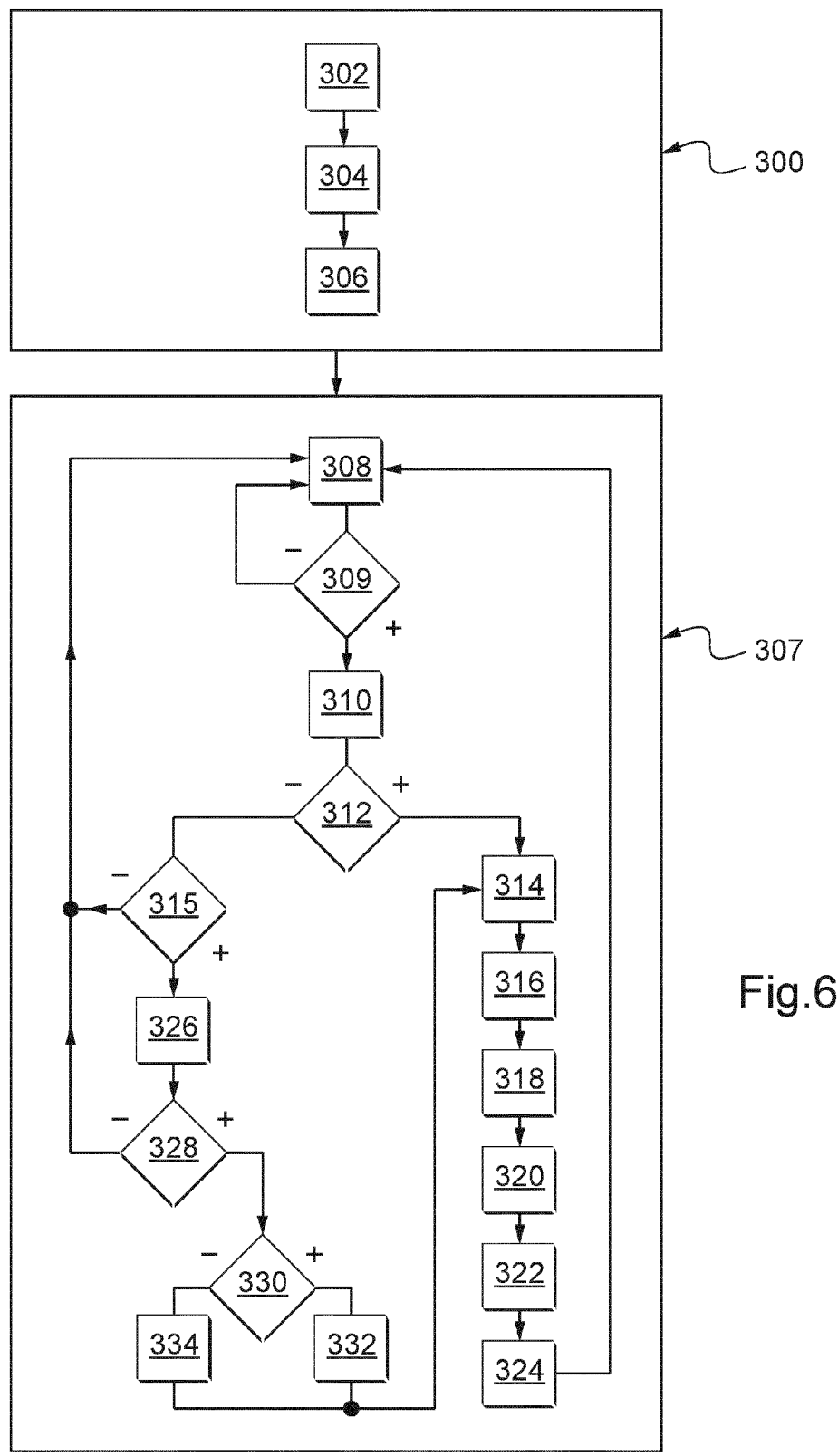
FIG. 6 is a flowchart of the method for receiving a scrambled multimedia content in the system of FIG. 1.

In another variant, the security processor which executes the reception method of FIG. 5 or 6 is the processor of a chip card.

Again as a variant, the ECMs do not comprise any ICF identifier of one virtual daughter card in particular, but the identifier of a set of virtual daughter cards. In this case, when the reception terminal receives the ECM message, the terminal tries out all the virtual daughter cards associated with this set until it finds the virtual daughter card enabling the decryption of the cryptogram $CW^*$ contained in the ECM.

In another variant, no identifier of the new virtual daughter card to be used is transmitted to the terminal. For example, in this case, the terminal, each time that it receives a new cryptogram $CW^*_t$, checks to see if the currently selected virtual daughter card enables the accurate decryption of this cryptogram. If the answer is yes, it continues to use the current virtual daughter card. If the answer is negative, it successively tries out all the virtual daughter cards that it has in memory until it finds the one that enables this cryptogram to be decrypted. This virtual daughter card is then selected for use instead of the former one.

As a variant, during the phase 300, the virtual daughter cards are not transmitted by means of EMMs but through a dedicated service in a broadcast (i.e. a broadcast to all the terminals connected to the network 8) or multicast (i.e. a broadcast to a particular group of terminals connected to the network 8) such as DVB-SSU or DSM-CC, or again through an ECM.

Should the network 8 be a hybrid network (for example the network 8 is formed by a TNT network and an Internet network) the device 6 can transmit a URL (universal resource locator) to the terminals of a virtual daughter card server. Each terminal downloads the virtual daughter cards from this server. Preferably, the downloading of the virtual cards is secured. For example, the use of the SSL (secure shell) or HTTPS (hyper text transfer protocol secured) protocols and/or the use of a public key infrastructure (better known as a PKI) is recommended. It is possible to implement this variant by means of a system using IPTV or WebTV.

In order to limit virtual daughter cards in time, a duration of validity can be incorporated into each card.

In the method of FIG. 5, as a variant, during several cryptoperiods, the same virtual mother card is preserved but the mother software patch is changed at each cryptoperiod.

In another variant, for this method, at each new cryptoperiod, the virtual mother card is changed but the same software patch is kept.

Preferably, the virtual mother card is changed at least every 30 minutes or at least every 10 minutes or even more preferably at least every minute.

The invention claimed is:

1. A method for transmitting and receiving a multimedia content, each cryptoperiod CPt of said multimedia content is scrambled by a respective control word CWt, said method comprising using an operating key and executable code of an encryption algorithm contained in a first virtual mother card, encrypting, by a sender, said control word CWt to obtain a cryptogram CW*t, using executable code of a syntax constructor contained in said first virtual mother card, generating, by said sender, an entitlement control message that incorporates said cryptogram CW*t, and transmitting, by said sender, said entitlement control message to a terminal, at said terminal, receiving said entitlement control message, using executable code of a syntax analyzer contained in a first virtual daughter card associated with said first virtual mother card, locating a position of said cryptogram CW*t in said received entitlement control message, and using an operating key and a decryption algorithm contained in said first virtual daughter card, decrypting said cryptogram CW*t to obtain a decrypted control word CWt, using said decrypted control word CWt, descrambling a cryptoperiod CPt of said scrambled multimedia content, changing, by said sender, at a frequency selected to achieve a selected level of security, said first virtual mother card into a second virtual mother card used to encrypt a control word CWt+n to obtain a cryptogram CW*t+n of a following cryptoperiod CPt+n of said multimedia content, wherein changing, by said sender, said first virtual mother card comprises automatically changing said first virtual mother card at least once each two-hour period and wherein said second virtual mother card differs from said first virtual mother card by having a different operating key and a difference in at least one of executable code of an encryption algorithm thereof and executable code of a syntax constructor thereof, in response, selecting, by said terminal, a second virtual daughter card to be used to decrypt said cryptogram CW*t+n so as to obtain said control word CWt+n.

2. The method of claim 1, wherein said second virtual mother card differs from said first virtual mother card by having a difference in said executable code of said encryption algorithm thereof and said syntax constructor thereof.

3. The method of claim 1, wherein changing, by said sender, said first virtual mother card comprises automatically changing said first virtual mother card at least once within a 30 minute period.

4. The method of claim 1, wherein changing, by said sender, said first virtual mother card comprises automatically changing said first virtual mother card at least once within a 10 minute period.

5. The method of claim 1, wherein changing, by said sender, said first virtual mother card comprises automatically changing said first virtual mother card at least once every minute.

6. A method for generating entitlement control messages, each entitlement control message comprising a cryptogram CW*t of a control word CWt used to scramble a respective cryptoperiod CPt of a multimedia content, said method comprising, encrypting, by a sender, said control word CWt to obtain said cryptogram CW*t using an operating key and executable code of an encryption algorithm contained in a first virtual mother card, generating, by said sender, an entitlement control message incorporating said cryptogram CW*t using executable code of a syntax constructor contained in said first virtual mother card, changing, by said sender, at a frequency selected to achieve a selected level of security, said first virtual mother card to a second virtual mother card used to encrypt a control word CWt+n to obtain a cryptogram CW*t+n of a following cryptoperiod CPt+n of said multimedia content, wherein said changing of said first virtual mother card comprises automatically changing, by said sender, said first virtual mother card at least once each two-hour period and wherein said second virtual mother card differing from said first virtual mother card by having a different operating key and a difference in at least one of executable code of an encryption algorithm thereof and executable code of a syntax constructor thereof.

7. The method of claim 6, further comprising transmitting, to a terminal, in an entitlement control message, an identifier of a virtual daughter card to be used to decrypt said cryptogram CW*t+n.

8. The method of claim 6, wherein changing said first virtual mother card comprises selecting a new virtual mother card from a set of virtual mother cards pre-recorded within said sender, said virtual mother cards belonging to said set being distinct from one another.

9. The method of claim 8, wherein selecting said new virtual mother card from a set of virtual mother cards comprises selecting pseudo-randomly from said set.

10. The method of claim 6, further comprising selecting, as a function of said multimedia content to be scrambled, a set of several different virtual mother cards from among several sets of virtual mother cards, and using a relationship associating, with each multimedia content, only one set of virtual mother cards, each virtual mother card belonging exclusively to a unique set, and encrypting control words for scrambling said multimedia content solely using virtual mother cards selected from a set associated with said multimedia content, thereby limiting access to said scrambled multimedia content solely to reception terminals having available a set of virtual daughter cards corresponding to said set of virtual mother cards.

11. A method of reception, through a terminal, said method comprising receiving, by said terminal, a cryptogram CW*t of a control word CWt using one or more entitlement control messages, locating, by said terminal, a position of said cryptogram CW*t in a received entitlement control message using executable code of a syntax analyzer, and decrypting, by said terminal, said cryptogram CW*t to obtain a decrypted control word CWt using an operating key and executable code of a decryption algorithm, wherein said executable code of said syntax analyzer and said executable code of said decryption algorithm are contained in a virtual daughter card received from a sender or pre-recorded in said terminal and associated with a virtual mother card used by the sender, and using said decrypted control word CWt, descrambling a cryptoperiod CPt of scrambled multimedia content, in response to a changing, at a frequency selected to achieve a selected level of security, of said virtual mother card by said sender, wherein said changing of said virtual mother card by said sender comprises automatically changing, by said sender, said virtual mother card at least once each two-hour period, selecting, by said terminal, a new virtual daughter card to be used for decrypting a cryptogram CW*t+n of a following cryptoperiod CPt+n of said scrambled multimedia content, said selection being made from a set of virtual daughter cards pre-recorded in said terminal so as to obtain a decrypted control word CWt+n, each virtual daughter card of said set differing from other virtual daughter cards of said set by having a different operating key and a difference in at least one of executable code of decryption algorithm thereof and executable code of a syntax analyzer thereof.

12. The method of claim 11, wherein receiving said cryptogram CW*t of said control word CWt using said one or more entitlement control messages comprises receiving an identifier of a virtual daughter card, and wherein selecting a new virtual daughter card comprises selecting based on said identifier.

13. The method of claim 12, wherein said method further comprises, before receiving a cryptogram CW*t of said control word CWt using said one or more entitlement control messages, and before selecting, by said terminal, said new virtual daughter card to be used for decrypting said cryptogram CW*t, receiving, by said terminal, an encrypted virtual daughter card, storing said received encrypted virtual daughter card to add said received encrypted virtual daughter card to said set of pre-recorded virtual daughter cards, and decrypting said encrypted virtual daughter card in response to receiving said identifier.

14. The method of claim 11, wherein receiving said cryptogram CW*t of said control word CWt using said one or more entitlement control messages comprises receiving one or more additional instructions, and in response, modifying said executable code of said selected virtual daughter card by completing and/or replacing only one part of instructions of said executable code of said selected virtual daughter card with said received one or more additional instructions.

15. A manufacture comprising a non-transitory computer-readable medium having encoded thereon instructions for execution, by an electronic computer, for
  receiving, using one or more entitlement control messages, a cryptogram CW*t of a control word CWt,
  locating a position of said cryptogram CW*t in said one or more entitlement control messages received using an executable code of a syntax analyzer, and
  decrypting said cryptogram CW*t to obtain the control word CWt using an operating key and an executable code of a decryption algorithm, said executable code of said syntax analyzer and executable code of said decryption algorithm being contained in a virtual daughter card received from a sender or pre-recorded in said electronic computer and associated with a virtual mother card used by said sender,
  descrambling a cryptoperiod CPt of scrambled multimedia content using said obtained control word CWt, and
  responding to a change, by said sender, at a frequency selected to achieve a selected level of security, of said virtual mother card by selecting a new virtual daughter card to be used for decryption of a cryptogram CW*t+n of a following cryptoperiod CPt+n of said multimedia content from a set of pre-recorded virtual daughter cards so as to obtain a decrypted control word CWt+n, wherein the change by said sender of said virtual mother card comprises automatically changing, by said sender, said virtual mother card at least once each two-hour period and wherein said new virtual daughter card differs from other virtual daughter cards of said set by having a different operating key and a difference in at least one of executable code of decryption algorithm thereof, and executable code of a syntax analyzer thereof.

16. An apparatus comprising
  a transmitter, said transmitter comprising a scrambler configured for using a control word CWt for scrambling a respective cryptoperiod CPt of a multimedia content,
  a system configured for using an operating key and executable code of an encryption algorithm contained in a first virtual mother card to encrypt said control word CWt to obtain a cryptogram CW*t and configured to use executable code of a syntax constructor contained in said first virtual mother card to generate an entitlement control message incorporating said cryptogram CW*t,
  said transmitter being further configured to change, at a frequency selected to achieve a selected level of security, said first virtual mother card to a second virtual mother card to obtain a cryptogram CW*t+n of a following cryptoperiod CPt+n of said multimedia content, wherein said changing of said first virtual mother card comprises automatically changing, by said transmitter, said first virtual mother card at least once each two-hour period and wherein said second virtual mother card differing from said first virtual mother card by having a different operating key and at least one of different executable code for an encryption algorithm thereof and different executable code of a syntax constructor.

17. An apparatus comprising a reception terminal, said reception terminal comprising
  a set of pre-recorded virtual daughter cards,
  a receiver capable of receiving, using one or more entitlement control messages, a cryptogram CW*t of a control word CWt, and
  an integrated circuit configured to locate a position of said cryptogram CW*t in said one or more entitlement control messages received using executable code of a syntax analyzer, and to decrypt said cryptogram CW*t to obtain the control word CWt using an operating key and an executable code of a decryption algorithm, said executable code of said syntax analyzer and said executable code of said decryption algorithm being contained in a virtual daughter card associated with a virtual mother card, said integrated circuit being further configured to descramble a cryptoperiod CPt of scrambled multimedia content using said obtained control word CWt, wherein said integrated circuit is further configured to respond to a change, by a sender, at a frequency selected to achieve a selected level of security, of said virtual mother card by selecting a new virtual daughter card to be used for decryption of a cryptogram CW*t+n of a following cryptoperiod CPt+n of said multimedia content from a set of pre-recorded virtual daughter cards so as to obtain a decrypted control word CWt+n, wherein said changing of said virtual mother card comprises automatically changing, by said sender, said virtual mother card at least once each two-hour period and wherein said new virtual daughter card differs from other virtual daughter cards of said set by having a different operating key and a difference in at least one of executable code of a decryption algorithm thereof and executable code of a syntax analyzer thereof.

18. A manufacture comprising a non-transitory computer-readable medium having encoded thereon instructions for execution, by an electronic computer, for generating, by a sender, entitlement control messages, each of said entitlement control messages comprising a cryptogram $CW^*t$ of a control word $CWt$ used to scramble a respective cryptoperiod $CPt$ of a multimedia content, encrypting, by said sender, said control word $CWt$ to obtain said cryptogram $CW^*t$ using an operating key and executable code of an encryption algorithm contained in a first virtual mother card, generating, by said sender, an entitlement control message incorporating said cryptogram $CW^*t$ using executable code of a syntax constructor contained in said first virtual mother card, changing, by said sender, at a frequency selected to achieve a selected level of security, said first virtual mother card to a second virtual mother card used to obtain a cryptogram $CW^*t+n$ of a following cryptoperiod $CPt+n$ of said multimedia content, wherein said changing of said first virtual mother card comprises automatically changing, by said sender, said first virtual mother card at least once each two-hour period and wherein said second virtual mother card differing from said first virtual mother card by having a different operating key and a difference in at least one of executable code of an encryption algorithm thereof and executable code of a syntax constructor thereof.

* * * * *